(No Model.)
H. D. TAYLOR.
OBJECT GLASS FOR TELESCOPES.
No. 540,339. Patented June 4, 1895.
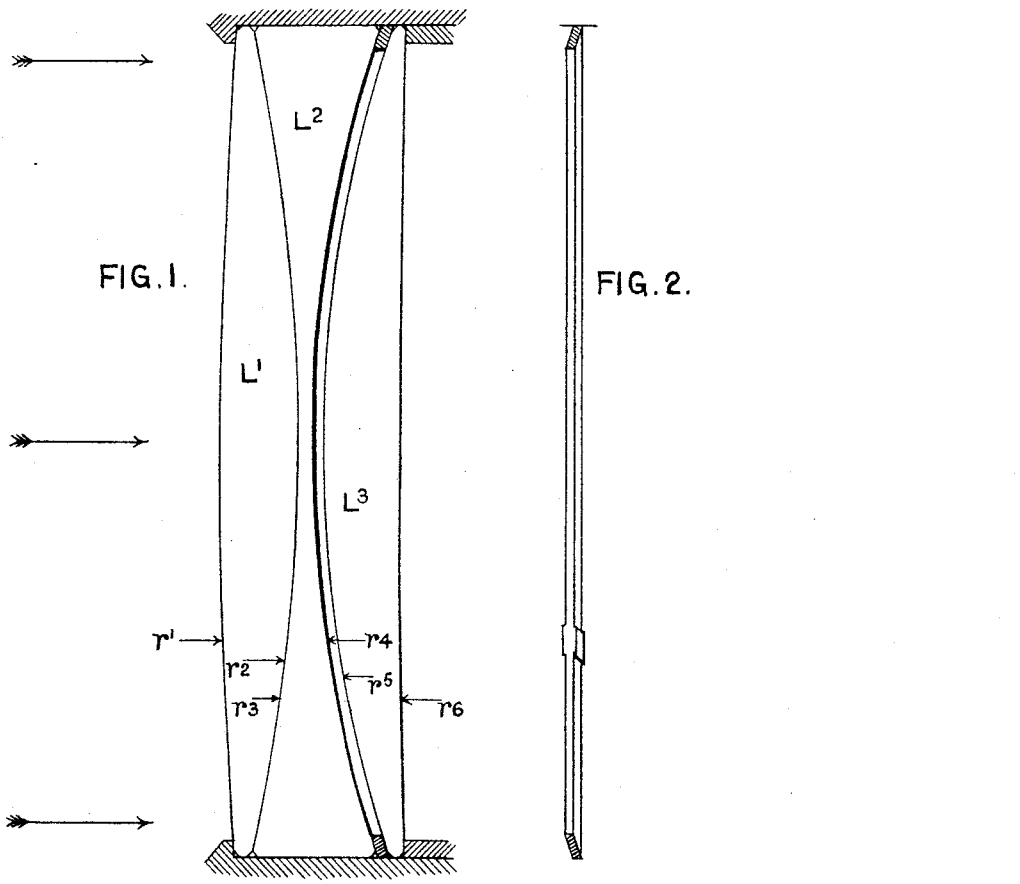
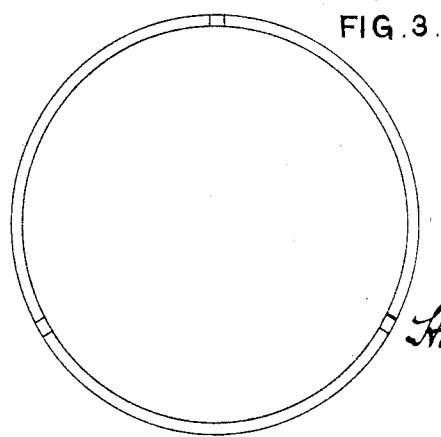

UNITED STATES PATENT OFFICE.

HAROLD DENNIS TAYLOR, OF YORK, ENGLAND.

OBJECT-GLASS FOR TELESCOPES.

SPECIFICATION forming part of Letters Patent No. 540,339, dated June 4, 1895.

Application filed September 21, 1893. Serial No. 486,074. (No model.)

*To all whom it may concern:*

Be it known that I, HAROLD DENNIS TAYLOR, a subject of the Queen of Great Britain, residing at York, in the county of York, England, have invented certain new and useful Improvements in Object-Glasses for Telescopes, of which the following is a specification.

It is well known to opticians and scientific men that the so called achromatic object-glass composed of the usual crown and flint glasses is not by any means truly achromatic; that is, it does not truly refract rays of all colors proceeding from a white star to one and the same focal point. The blue and violet rays above all others are refracted to a diffused focus far beyond the visual focus, and are therefore useless either for visual defining purposes or for photographic purposes. As an excellent and typical example, I may refer to the table giving the measured focal distances, for the various colors of the spectrum, of the great Lick telescope in California, published in the publications of the Astronomical Society of the Pacific, No. 9, 1890, page 162. It can be shown that the eye selects a focus where two bright complementary colors, full red and bluish green, focus together, giving a visual impression of white. The greater part of all the other colors are thus useless for definition in the case of a large telescope, and, if the object viewed is a star, the effect is that a diffused halo of wasted light is formed around its image. The photographic rays about G', the blue hydrogen band, are refracted to an indefinite focus situated about one four hundred and fiftieth part of the principal focal length beyond the visual focus, and therefore a visually corrected object-glass of ordinary form is not adapted for photography. A photographic correcting lens has to be placed in front of the object glass of a very large telescope in order to consolidate the actinic rays to a more compact focus, whenever a photograph has to be taken. This shortens the focal length by many feet.

It is the principal object of my invention to produce an objective which shall be free from these serious color aberrations and be, as a matter of fact, as achromatic as a reflecting telescope, and therefore directly available for photography. I attain this very important condition by combining together three lenses of three different sorts of glass respectively, two positive lenses and one negative lens.

The three glasses employed by me are as follows:

First. A baryta light flint glass having the following optical properties, (I shall designate this glass as 0.543 for the sake of reference:)

Index of refraction for D ray $= 1.5637$.

Reciprocal of its dispersive power for interval C to F $= 50.6 = \dfrac{.5637}{.01115}$.

Partial dispersions or differences of indices for the following spectral intervals:

| C to F | A' to C | D to F | E to F | F to G' | F to H' |
|---|---|---|---|---|---|
| .01115 | .00374 | .00790 | .00369 | .00650 | .01322 |

Proportional parts of the above compared with the dispersion interval C to F, which is taken as the unit of comparison:

| 1.0000 | .3354 | .7085 | .3309 | .5830 | 1.1857 |

Second. A boro-silicate flint glass which I shall designate as 0.658 for reference. The optical properties of this class are as follows:

Index of refraction for the D ray $= 1.5468$.

Reciprocal of its dispersive power for the interval C to F $= 50.2 = \dfrac{.5468}{.01089}$.

Partial dispersions, in the sense explained above:

| C to F | A' to C | D to F | E to F | F to G' | F to H' |
|---|---|---|---|---|---|
| .01089 | .00373 | .00768 | .00357 | .00628 | .01279 |

Proportional parts, C to F being unity:

| 1.0000 | .3425 | .7052 | .3278 | .5767 | 1.1745 |

Third. A light silicate crown glass, which I shall designate as 0.374 for reference. Its optical properties are mainly as follows:

Refractive index for the D ray $= 1.5109$.

Reciprocal of its dispersive power for interval C to F $= 60.5 = \dfrac{.5109}{.00844}$.

Partial dispersions in the sense above explained:

| C to F | A' to C | D to F | E to F | F to G' | F to H' |
|---|---|---|---|---|---|
| .00844 | .00296 | .00593 | .00274 | .00479 | .00976 |

Proportional parts of above dispersions when dispersion from C to F is taken as unity:

| 1.0000 | .3507 | .7026 | .3247 | .5675 | 1.1564 |
|---|---|---|---|---|---|

In the case of all three glasses, the spectral intervals from E to F and from F to H have been calculated from the other data by a well known dispersion formula. The reciprocals of dispersive powers are obtained by dividing the index of deviation for the D ray by the dispersive interval from C to F, for each glass.

Ordinary English hard crown glass and its varieties answer tolerably closely to the above specified optical properties of glass 0.374, but its use, in place of the glass herein specified, is not to be recommended, as the resulting achromatism would not be so perfect, especially for large objectives. At the present time these three sorts of glass can be obtained from Messrs. Schott and Gen, optical glass manufacturers, Jena, Germany.

The baryta light flint glass above specified corresponds to the No. 58 or type 0.543 in the supplement to Messrs. Schott's catalogue issued in July, 1886. The boro silicate flint glass is a slight modification of the type 0.164 in the same catalogue, and has been specially designated as 0.658 by Messrs. Schott. The light silicate crown glass corresponds more especially to the type 0.374 in the aforesaid supplement to their catalogue. Type 0.337 is an exceedingly close variation from this glass and may be used instead, but not with so much advantage.

I will now proceed to show how very accurately a combination of the above three glasses in the form of a triple object-glass can be made to refract all the colors of the spectrum to the same focus.

I make two positive lenses, of the baryta light flint glass 0.543 and of the light silicate crown glass 0.374 respectively. Let the algebraic sum of the reciprocals of the two radii of the first lens, made of 0.543, be called $\frac{1}{P'}$, a convex surface having its radius reckoned positive and a concave surface having its radius reckoned negative, and let the algebraic sum of the reciprocals of the two radii of the third lens, made of 0.374, be called $\frac{1}{P^3}$; and let it be supposed that the two lenses are so curved that $\frac{1}{P'}=\frac{1}{P^3}$. Under these conditions, it is evident to those conversant with optics that the partial dispersions of these two lenses combined, for any given region of the spectrum, are obtained by simply adding together their respective dispersions for that region of the spectrum.

I herewith give a table, in which, in column 2, I give the partial dispersions for baryta light flint 0.543 for those different regions of the spectrum indicated in column 1. In column 3, I give the corresponding partial dispersions for the same regions of the spectrum for the silicate crown glass 0.374. In column 4, I give the sums of the partial dispersions, for each region of the spectrum, obtained by simply adding together the partial dispersions for 0.543 and 0.374 respectively, for the same region of the spectrum, as indicated in column 1. In column 5, I take the combined dispersion, as shown in column 4, for the spectral region C to F, as the unit of comparison and give the relative proportions of the other combined dispersions for the other spectral regions in fractional parts, in the same manner precisely as I have done in the case of the three glasses considered separately. In column 6, I give the corresponding proportional dispersions, in the same sense as in column 5, for the boro-silicate flint glass 0.658. I need scarcely explain to those conversant with optics that the perfection of the achromatism of the triple combination is made manifest by the remarkably close agreement between the proportional dispersions for the two positive lenses of 0.543 and 0.374 combined on the one hand, and the proportional dispersions for the negative lens of 0.658 on the other hand.

The "rationality" of dispersion, as it is generally termed, is in remarkably close agreement. Thus, if the spectrometric observations of the above three types of glass and the consequent data which I have given above are strictly accurate, then the only deviation of any colored ray from true focus by any amount of consequence is in the case of the

| 1.—Spectral regions. | 2.—Partial dispersions for glass 0.543. | 3.—Partial dispersions for glass 0.374. | 4.—Combined dispersions of the two glasses 0.543 and 0.374. | 5.—Proportional dispersions, C to F being unity. | 6.—Proportional dispersions for glass 0.658. |
|---|---|---|---|---|---|
| C to F  | .01115 | .00844 | .01959 | 1.0000 | 1.0000 |
| A' to C | .00374 | .00296 | .00670 | .3420 | .3425 |
| D to F  | .00790 | .00593 | .01383 | .7059 | .7052 |
| E to F* | .00369 | .00274 | .00643 | .3282 | .3278 |
| F to G' | .00650 | .00479 | .01129 | .5763 | .5767 |
| F to H'* | .01322 | .00976 | .02298 | 1.1730 | 1.1745 |

*Figures calculated from observed data by means of a well-known dispersion formula.

H' ray, at the extreme violet extremity of the spectrum. As an instance, I could show that, in the case of a twelve inch triple object-glass of the construction herein specified and of fifteen feet focal length, the H' ray would focus at a point about six hundredths of an inch beyond the focus for the brightest colors, supposing the object glass is properly corrected for achromatism.

In the case of an ordinary double object-glass of fifteen feet focal length, the deviation of the H' ray beyond focus, supposing that the rays C and F are refracted to the same focus, would be about .85 of an inch or fourteen times as much.

I need scarcely point out that the achromatic correction and freedom from secondary spectrum of my objective are independent of the order in which the three lenses are placed, provided they are in contact or nearly so, but depends upon the proper ratios between the powers of the lenses as expressed by the values of $\frac{1}{P'}$, $\frac{1}{P^2}$ and $\frac{1}{P^3}$. The order in which they are placed and the forms of the lenses are subordinated to other very important considerations, as I will now explain, after first giving the curves, &c., which I have found to give the finest results and greatest practical advantages which it is possible to secure for my invention.

First. The accompanying drawings show, in Figure 1 a cross section of an objective of six inches aperture and about one hundred and eight inches focal length for parallel rays, which are supposed to enter the objective from left to right. Then the three lenses are placed in the following order: First. The positive lens of baryta light flint glass 0.543. This is L in the drawings. Second. The negative lens of the boro silicate flint glass 0.658. This is $L^2$ in the drawings. Third. The positive lens of light silicate crown glass 0.374. This is $L^3$ in the drawings.

I will now give the radii of the curvatures for a focal length of about one hundred and eight inches in the order in which the light passes through the objective, indicating a convex surface by a plus (+) sign before its radius of curvature, and a concave surface by a minus (−) sign placed before its radius of curvature. These radii are expressed in inches.

| First Lens $L'$. | | Second Lens $L^2$. | | Third Lens $L^3$. | |
|---|---|---|---|---|---|
| $r'$. | $r^2$. | $r^3$. | $r^4$. | $r^5$. | $r^6$. |
| +41.45 | +14.08 | −14.08 | −9.64 | +9.64 | −200 about |
| Central thickness= .6. | | Central thickness= .12. | | Central thickness= .6. | |

Separation between $L'$ and $L^2$=as little as possible. Separation between $L^2$ and $L^3$=.09.

The above radii of curvatures, &c., may be more generally expressed in fractional or decimal parts of the focal length—thus:

Principal focal length=1.0000.

| First Lens $L'$. | | Second Lens $L^2$. | | Third Lens $L^3$. | |
|---|---|---|---|---|---|
| $r'$. | $r^2$. | $r^3$. | $r^4$. | $r^5$. | $r^6$. |
| +.3838 | +.1304 | −.1304 | −.0893 | +.0893 | −1.852 about |
| Central thickness= .0055. | | Central thickness= .0011. | | Central thickness= .0055. | |

Separation between $L'$ and $L^2$=as little as possible. Separation between $L^2$ and $L^3$= .000833.

The radii of curvatures and other dimensions for an objective of any desired focal length, all expressed in inches, may be obtained by simply multiplying the fractions given in the last preceding table by the focal length required. These curves give the following very important advantages:

First. Only four pairs of tools are required, since the inner contiguous pairs of surfaces are worked to the same radius.

Second. The achromatism of the objective can be perfectly secured, or else varied to suit different sorts of eyepieces, by simply altering the radius of curvature of the back or concave surface of $L^3$ in the usual way, without causing any disturbance in the corrections for spherical aberration, for the light passes through this sixth surface so nearly at perpendicular incidence that the effect upon the spherical aberration caused by this surface is almost nothing.

Third. The objective is free from spherical aberration for all colors alike, a condition of considerable importance in the case of a truly achromatic objective. This condition depends upon the separation between $L^2$ and $L^3$ not being allowed to vary more than ten to fifteen per cent. from the amount specified above.

Fourth. The objective yields the largest possible field of view, the oblique images of stars being quite free from "coma" or side flare.

Fifth. This construction admits of all six surfaces being tested as to their state of figuring either by a direct or an indirect method, as I shall shortly explain. This condition is of immense importance in the practical construction of the objective. In the case of a double objective, there are two convex surfaces, and in the case of a double objective giving the largest possible field of view, there are three convex surfaces, none of which, in either case, can be individually tested for serious errors in figuring which are nevertheless too small to be detected by any spherometer. Consequently, a serious amount of time is often lost in refiguring the wrong surfaces.

Sixth. The condition that the rays shall enter and leave the surfaces of the mechanically weak negative lens $L^2$ at approximately equal angles is tolerably well fulfilled. Under these conditions it can be shown that any probable amount of sagging or flexure of the negative lens can have little or no effect in deteriorating the optical performance of the objective.

If specially desired, the above relation of one to eighteen between aperture and focal length, as indicated in the diagram, can be made even one to fifteen if the central thicknesses of the two positive lenses and the edge thickness of the negative lens are sufficiently increased; but this greater proportion of aperture to focal length is not to be advised for any objective of more than five or six inches aperture, for it increases the difficulties of working and the absorption and loss of light due to thickness and more oblique incidence at the margins of the surfaces.

The lenses should be ground and smoothed in the usual way and may then undergo any of the rough polishing processes. After that, they must be figured by careful pitch polishing such as is generally adopted by opticians.

$L'$ {
First surface may be figured with either lens or polisher uppermost.
Second surface should be figured with the polisher uppermost.
}

$L^2$ {
Third surface should be figured with the lens uppermost.
Fourth surface should be figured with the lens uppermost.
}

$L^3$ {
Fifth surface should be figured with the polisher uppermost.
Sixth surface may be figured with either the lens or the polisher uppermost.
}

The third, fourth and sixth surfaces, being concave, can be directly tested for figure by placing an artificial star close to the center of curvature and examining the reflected image of the same with an eyepiece, which may be a low power in case of the comparatively flat sixth surface, but in the case of the third and fourth surfaces the eyepiece should consist of a rather high power microscope objective of tolerably large angular aperture, and corrected for spherical aberration. For an ordinary high power eyepiece, either of the Huygenian or Ramsden construction, gives rise to such an amount of spherical aberration in the case of a reflecting surface of large relative aperture, as to disguise the effects of minor irregularities of surface. Two or three combined of the ordinary microscope objectives, sold screwed together in sticks or rolls, answer the purpose very well, if picked for good quality. Before trying the triple objective as a whole, the lenses should be most carefully edged down in a proper dioptric centering lathe and fitted accurately into the metal cell which is intended for receiving the objective.

Lenses $L'$ and $L^2$ should always be just kept apart and prevented from scratching one another by means of three pieces of the thinnest tin foil carefully gummed or cemented at equidistant intervals round the edge of the front lens $L'$, just outside the limits of aperture as usual. All superfluous cement should be squeezed out from underneath the tinfoil, which should be carefully smoothed down to the glass.

The brass ring shown in Fig. 3 in plan (half size), and in Fig. 2 in cross section, should be placed between the second and third lenses. It is of the utmost importance that the three projecting or thicker parts of this ring should be shaped to the curve in the lathe and be kept of exactly equal thicknesses, measured parallel to the optic axis, and equal to the amount of separation specified in the above schedule of curves. Of course this thickness, which determines the separation between $L^2$ and $L^3$, is directly proportional to the focal length required, as in the case of the radii of curvatures. If the brass ring is too thick at first, it may be reduced at its three projecting parts by judicious grinding between the two tools to which surfaces $r^4$ and $r^5$ have been worked, perhaps followed by scraping, taking care to keep the thicknesses equal by careful calipering, for if the thicknesses of the projections on this ring are unequal, then a side flare or eccentric "coma" will be noticeable at the focus, when trying the objective on a star. If the flare extends toward the right hand when observing the star image, then the lenses $L^2$ and $L^3$ are relatively too far apart on the left hand, or, in other words, the brass separating ring is relatively too thick on the left hand, where it must therefore be reduced. The three studs or projections on the brass ring have to so lie in the cell as to come in alignment with the three pieces of tinfoil separating $L'$ from $L^2$. Also the two opposing shoulders of the cells should be provided with three shallow and equidistant projecting studs to correspond with the two other sets, so that, when finally fitted up, as well as when trying the objective, it may be just gently confined free from shake and the lenses held up to one another at three equidistant points round their edges. The counter ring keeping the objective home in its cell should be fastened or screwed to the body of the cell at three points intermediate between its three projecting studs. This secures elasticity in the confinement of the objective.

Supposing the objective is placed in its cell for trial upon a real or artificial star, and certain irregularities of figuring are evident at the focus, and provided it is known that the bad figuring does not reside in any of the concave surfaces, then the convex surfaces may be thus tested. For testing the second surface $r^2$, let the objective be taken apart again, and then pour a few drops of a liquid, having a refractive index approximately equal to that of glass, spirits of turpentine answering very well, into the middle of the third surface, the first lens being then replaced as before. Then the thin interspace between $L'$ and $L^2$ will be filled up with the liquid. It need scarcely be pointed out that, if the objective be now tried again, then all the faults of figuring before visible at the focus will now more or less totally disappear, if they exist in the second surface; for the index of refraction from the glass of $L'$ into the liquid is so very nearly equal to 1, that the index of deviation is reduced to practically nothing and therefore errors of figuring can exert no perceptible effect at the focus. If, however, the errors still appear at the focus, it is evident that either the first or fifth surface must be at fault or both.

In order to test the fifth surface, take the objective apart, dry and clean the second and third surfaces, place the brass ring between the second and third surfaces, fasten three equidistant pieces of thin tinfoil onto the edge of the fifth surface to prevent any scratching or cohesion between the surfaces $r^4$ and $r^5$. Let the objective be now replaced in its cell and the focal image be carefully examined. Although the lenses L' and L² are now separated by the brass ring instead of L² and L⁵ and the two latter are almost in contact, yet it will be found that the appearances of the image will be substantially the same as when the objective was tried in its normal condition, and the irregularities of figuring should still be recognizable. Then the refracting liquid is introduced between L² and L³ in the same way as it was before introduced between L' and L², and the objective, with the brass ring still between L' and L², is tried again. Then, if the irregularities before visible at the focus are found to have vanished, the presumption is that the fifth surface $r^5$ is at fault; but if the irregularities are still to be seen at the focus, then the presumption is that the first surface $r'$ is at fault. Thus all the surfaces may be individually tested. When the surfaces are accurately figured to spherical curves, the introduction of the refracting liquid either between L' and L², or between L² and L³, should make no perceptible difference in the character of the focal image, especially as regards spherical aberration.

The best refracting liquid to use is perhaps a mixture of four volumes of spirits of turpentine and three volumes of oil of cassia. This has a refractive index of about 1.54. The mixture, after being shaken up very thoroughly, should be allowed to settle and the clear liquid decanted for use.

If all the surfaces appear to be well and regularly figured and yet there is a little residual spherical aberration visible at the focus (doubtless caused by some surface being rather parabolic) the edge rays focusing short, then the brass ring may be thinned down somewhat until the spherical aberration is perfectly corrected. After that condition has been secured, then nothing remains but to alter the radius of the sixth surface in the usual manner, if necessary, until the color correction is judged to be perfect.

It should be observed that the negative lens of boro-silicate flint glass will tarnish badly if allowed to lie about openly exposed to the impure air of the workshop for many days, and it should consequently be placed in a tin box when not actually required for testing. Thus it may be sometimes advisable, after the objective has been properly figured up, to repolish over both sides of the boro-silicate flint as a final finish.

In giving tables setting forth the almost perfect achromatism of my objective, I have assumed that $\frac{1}{P'}$ for the positive lens L' is equal to $\frac{1}{P^3}$ for the other positive lens L³. This assumption happens to fall in remarkably well with the optical properties of the two glasses and also makes the calculations simple for illustrative purposes; but it should here be pointed out that this relation of equality can be departed from within narrow limits without appreciable prejudice to the perfection of the objective's color correction. For instance, in the case of the curves above specified $\frac{1}{P'}$ for the first lens equals about .96 $\frac{1}{P^3}$ for the third lens; but if $\frac{1}{P'}$ were less in value than about fourteen-fifteenths of $\frac{1}{P^3}$ then an appreciable amount of secondary color would be noticeable at the focus of the objective, if a large one. I should also point out that the optical properties of the three sorts of glass herein specified are not rigidly fixed, but small variations in their optical properties occur in the ordinary course of manufacture, and glasses are often turned out by the manufacturers which are intended to correspond to a certain catalogued type, but which actually turn out about intermediate in optical properties between the type of glass intended to be copied and the next closely analogous glass.

I declare that what I claim is—

1. A compound objective for telescopes consisting of two positive lenses, one being of baryta light flint glass, and the other of silicate crown glass, with a negative lens of boro-silicate flint glass,—the three glasses severally having the optical properties herein specified, and the three lenses being so adjusted in power, substantially as herein specified, as to yield an object glass giving an image practically quite free from secondary color aberrations.

2. In a compound object glass for telescopes, the combination of three lenses made respectively of glasses having their optical properties substantially as herein described and having approximately the following relative radii of curvatures expressed in decimal parts of the principal focal length of the whole combination:—the lens nearest the object made of glass 0.543 with a radius of curvature of .3838 for its convex surface next the object and .1304 for its convex surface away from the object; a second lens, with practically no separation between it and the first lens, made of glass 0.658 having a radius of curvature of .1304 for its concave surface next the object and a radius of .0893 for its concave surface away from the object, and a third lens, with a separation of .000833 between it and the second lens, made of glass 0.374, having a radius of curvature of .0893 for its convex surface next the object and a radius of curvature of about 1.852 for its concave side away from the object.

In testimony whereof I have signed my name to this specification in the presence of two subscribing witnesses.

H. DENNIS TAYLOR.

Witnesses:
W. P. THOMPSON,
H. R. SHOOBRIDGE.